Aug. 28, 1934.   J. GASPARI   1,971,444
EYEGLASS FRAME AND EYEGLASS RIMLESS MOUNTING
Filed May 24, 1932
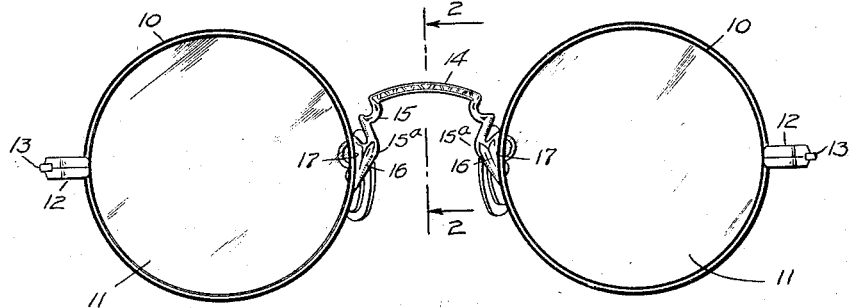
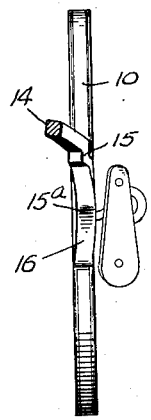
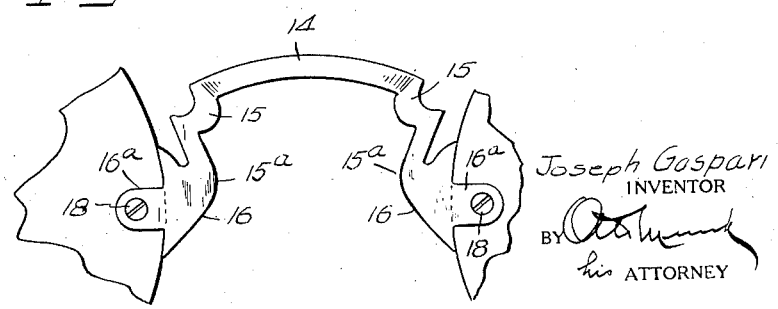
Joseph Gaspari
INVENTOR
BY
his ATTORNEY Patented Aug. 28, 1934

1,971,444

UNITED STATES PATENT OFFICE 1,971,444

EYEGLASS FRAME AND EYEGLASS RIMLESS MOUNTING

Joseph Gaspari, New York, N. Y.

Application May 24, 1932, Serial No. 613,238

1 Claim. (Cl. 88—43)

My invention relates to eyeglass frames and is especially directed to the construction of the bridge piece of spectacle frames of the rim or rimless types and the connection thereof with the lens rims.

The type of spectacle frame at present in fairly general use includes a bridge member which is connected to the rims of the lenses or directly to the latter by posts which extend from intermediate points of the legs of the bridge to the rim or straps and are soldered or otherwise secured to the parts which they interconnect.

There are certain inherent weaknesses and disadvantages in this type of construction which it is the principal object of my invention to overcome.

By the use of separate posts to connect the bridge to the rims, two points of connection at each side of the bridge are necessary, viz:—the connection of each post at one of its ends to the bridge and the connection at the opposite end of the post to the rim. These two connections, which are effected by solder or the like with the bridge, represent weakness of structure in that but comparatively slightly rough usage such as might occur in the adjustment of the frame or the cleaning of the lenses, may cause rupture at these points. Moreover, owing to such relative weakness greater than ordinary care must be taken in adjusting the frame to the face of the wearer, which entails considerable expenditure of time and consequent greater cost to the purchaser.

Owing to the connection of the posts to the intermediate parts of the legs of the bridge, very little manipulation of the latter to make it rest properly on the sides of the nose can be done. To a certain extent, also, the intermediate posts tend to detract from the otherwise ornamental or decorative appearance of the bridge.

These several adverse factors are obviated by the construction of my invention in accordance with which the lower ends of the legs of the bridge are directly connected to the lens rims and the intermediate portions of such legs are shaped to properly rest against the opposite sides of or near the bridge of the wearer's nose.

An illustrative form of my invention is shown in the accompanying drawing, in which Figure 1 is a front elevation of my improved spectacle frame; Figure 2 is a vertical section on the line 2—2 of Figure 1; and Figure 3 is a detail showing the connection of the bridge directly to the lens by means of the so-called rimless mounting.

In the drawing, 10, 10 are the rims holding the lenses 11, 11 and having hingedly connected thereto at 12, the temple pieces 13.

The bridge comprises the transverse or bar member 14 and the lateral legs 15 the lower termini 16 of which are turned outwardly at an angle to the plane of the legs 15 and are connected as by soldering or welding to the proper points 17 of the rims 10. The bar 14 may be bowed outwardly somewhat beyond the plane of the rims 10 and legs 15, although it may lie in the same plane.

I preferably construct each leg with an inwardly inclined portion 15$^a$, the two portions 15$^a$ being designed to rest on or near opposite sides of the nose. The inclination of the two portions 15$^a$ is such that the smallest distance between them is adjacent the bar member 14 and the greatest distance at their lower ends.

In Figure 3, a rimless eyeglass mounting is illustrated in which each lower terminal 16 is provided with a pair of projections or straps 16$^a$ to embrace the lens itself and accommodate a screw 17 projecting through the two projections 16$^a$ and lens proper.

The construction herein contemplated is intended particularly for use with metal frames. The rims may entirely or only partially encircle the lenses, it being merely necessary that there be enough metal present to attach the bridge legs at the proper places.

I claim:

In an eyeglass frame comprising lens holding means, the combination of a bridge member consisting of a transverse bar, and legs integral with said bar, said legs having inwardly directed angular portions between the bar and leg ends to form oppositely disposed nose rests, and the lower ends of each leg being turned outwardly and extended in a vertcal plane to form a shoe to which is attached the adjacent side of the lens holding means.

JOSEPH GASPARI.